W. R. FEARN.
TROLLEY WHEEL.
APPLICATION FILED FEB. 27, 1919.
1,332,891.
Patented Mar. 9, 1920.
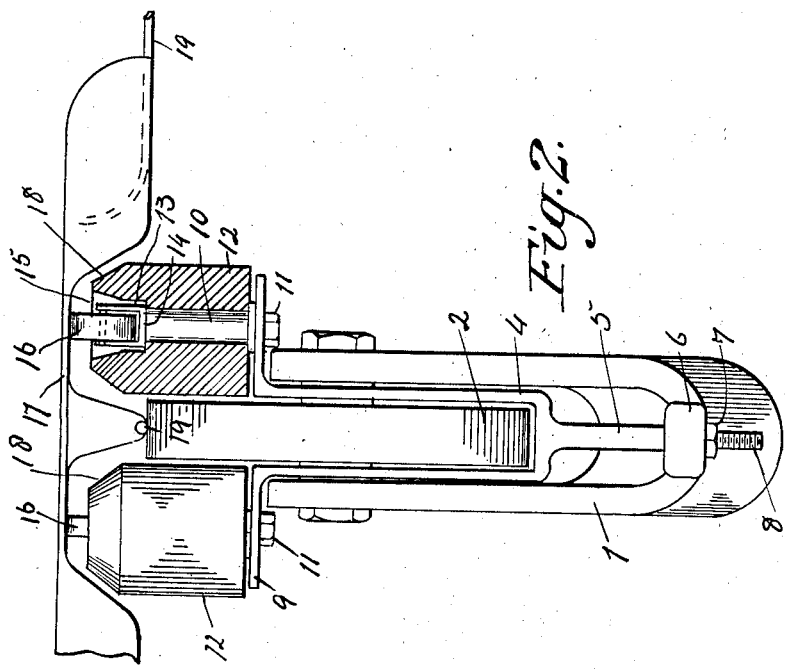
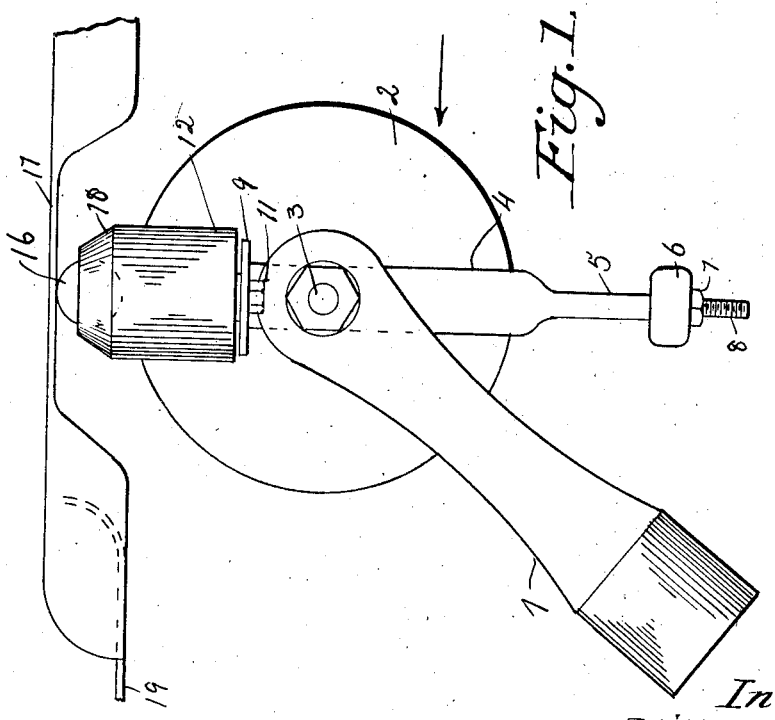
Inventor
William R. Fearn
W. W. Williamson

UNITED STATES PATENT OFFICE.

WILLIAM R. FEARN, OF CAMDEN, NEW JERSEY.

TROLLEY-WHEEL.

1,332,891.  Specification of Letters Patent.  Patented Mar. 9, 1920.

Application filed February 27, 1919. Serial No. 279,495.

*To all whom it may concern:*

Be it known that I, WILLIAM R. FEARN, a citizen of the United States, residing at Camden, in the county of Camden and State of New Jersey, have invented new and useful Improvements in Trolley-Wheels, of which the following is a specification.

My invention relates to a new and useful improvement in trolley wheels, and has for its object to provide an effective means for preventing the trolley wheel from jumping the trolley wire; lessening the friction of the trolley upon said wire especially on curves; and facilitates the passage of the trolley over crossings.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawing forming a part of this application in which—

Figure 1, is a side elevation of a trolley harp having my improvements applied thereto in conjunction with a crossing, and, Fig. 2, is an end view thereof looking in the direction of the arrow in Fig. 1, one of the guide rolls being in cross section to show the arrangement of the secondary wheels.

In carrying out my invention as here embodied 1 represents a trolley harp in which is journaled a trolley wheel 2 by means of the bolt 3 which passes through the arms of the harp and the hub of the wheel. This bolt also serves to pivot the yoke 4 in place, said yoke having a shank 5 formed therewith upon which is adjustably secured a weight 6 by means of the nut 7 running upon the threads 8. The upper ends of the yoke have formed therewith extensions 9 at right angles thereto and a spindle 10 is secured to each of these extensions by means of the nuts 11.

12 represents the guide rolls which are journaled upon the spindles 10 each spindle having its upper end forked and the base of each fork serves as a shoulder 14 to hold its roll against displacement.

A recess 15 is formed in each of the rolls for the reception of the forked end of the spindle in order that said forked end may be inclosed by the roll and in the fork is journaled a secondary wheel 16 the periphery projecting sufficiently above the upper end of the roll to ride upon the cross fixture 17 thus preventing the rolls from striking at such crossings.

The upper ends of the rolls 12 are beveled as indicated at 18 in order that they may readily enter into the channel ways of the crossings fixtures thereby guiding the trolley at such crossings.

The periphery of the trolley wheel 2 is flat in order that when traveling on the trolley wire 19 it may have a limited sidewise movement which prevents the wear incident to the contact between the wire and the trolley wheel from taking place on a single line as would be the case if this wheel were grooved.

The weight 6 is to be sufficient to normally hold the yoke 4 in a vertical position in order that the rolls 12 may be maintained in their upright positions and thus act as flanges for the trolley wheel 2, to prevent the trolley from jumping off the wire and as these rolls will revolve should they come in contact with the trolley wire during the forward movement of the trolley, the friction between said wire and these rolls will be greatly reduced over what would otherwise be the case if a flanged trolley wheel be used.

The fact that the yoke upon which the rolls are journaled is pivoted and therefore free to swing will prevent any damage from being done to the rolls should they strike a cross wire, as such action will cause the rolls to swing rearward until passing the obstruction.

This construction of a trolley will permit it to pass around a curve without undue strain or wear upon either the wire or the trolley since in so doing the wire will contact with the rolls and these being free to revolve will prevent the cutting action of sliding bodies.

Of course I do not wish to be limited to the exact details of construction as herein shown, as these may be varied within the limits of the appended claim without departing from the spirit of my invention.

Having thus fully described my invention, what I claim as new and useful is:—

In a device of the character described the combination of a trolley harp, a flat faced trolley wheel journaled within the harp, a yoke pivoted concentrically with said wheel and partly surrounding the same, a shank formed with the yoke, a counterweight secured upon said shank, a right angle extension formed with each of the upper ends of the yoke, a spindle secured to each of said extensions, a fork formed upon the upper end of each spindle, a guide roll journaled upon each of the spindles, each of said rolls having a recess in the upper end thereof for the housing of the forks, and a secondary wheel journaled in each of the forks.

In testimony whereof I have hereunto affixed my signature.

WILLIAM R. FEARN.